US008267742B2

(12) United States Patent
Kitagawa

(10) Patent No.: US 8,267,742 B2
(45) Date of Patent: Sep. 18, 2012

(54) SLICING METHOD AND A WIRE SAW APPARATUS

(75) Inventor: Koji Kitagawa, Nishishirakawa (JP)

(73) Assignee: Shin-Etsu Handotai Co., Ltd., Tokyo (JP)

( * ) Notice: Subject to any disclaimer, the term of this patent is extended or adjusted under 35 U.S.C. 154(b) by 274 days.

(21) Appl. No.: 12/451,669

(22) PCT Filed: May 2, 2008

(86) PCT No.: PCT/JP2008/001143
§ 371 (c)(1),
(2), (4) Date: Nov. 24, 2009

(87) PCT Pub. No.: WO2008/149490
PCT Pub. Date: Dec. 11, 2008

(65) Prior Publication Data
US 2010/0163010 A1    Jul. 1, 2010

(30) Foreign Application Priority Data
Jun. 8, 2007    (JP) .................................. 2007-152788

(51) Int. Cl.
*B24B 49/00* (2006.01)
(52) U.S. Cl. .................. 451/7; 451/10; 451/11; 451/36; 451/41; 451/53; 451/60; 451/296; 451/449; 125/16.02; 125/21
(58) Field of Classification Search ................ 451/7, 10, 451/11, 36, 41, 53, 54, 59, 60, 296, 446, 451/449; 125/16.01, 16.02, 21
See application file for complete search history.

(56) References Cited

U.S. PATENT DOCUMENTS

| 6,006,737 A | 12/1999 | Hayashi et al. |
| 6,408,840 B2 * | 6/2002 | Ishida .............................. 125/21 |

(Continued)

FOREIGN PATENT DOCUMENTS
JP         A-9-262826       10/1997
(Continued)

OTHER PUBLICATIONS

International Search Report for International Application No. PCT/JP2008/001143, issued Jun. 3, 2008.

(Continued)

*Primary Examiner* — Eileen P. Morgan
(74) *Attorney, Agent, or Firm* — Oliff & Berridge, PLC

(57) ABSTRACT

The present invention is a slicing method and a wire saw apparatus including winding a wire around a plurality of grooved rollers and pressing the wire against an ingot to be sliced into wafers while supplying a slurry for slicing to the grooved rollers and causing the wire to travel in a reciprocating direction, in which the ingot is sliced with controlling a temperature of the ingot by supplying a slurry for adjusting an ingot temperature to the ingot independently from the slurry for slicing while the slurry for adjusting an ingot temperature is supplied to the ingot only at the exit side of the wire caused to travel in the reciprocating direction. As a result, there is provided a method and a wire saw apparatus in which rapid cooling of an ingot especially in a time close to end of slicing of the ingot can be alleviated, consequently degradation of a nano-topography can be suppressed, and further high-quality wafers having a uniform thickness can be sliced when slicing the ingot by using a wire saw.

6 Claims, 11 Drawing Sheets

U.S. PATENT DOCUMENTS

| | | |
|---|---|---|
| 6,652,356 B1 | 11/2003 | Ariga |
| 6,773,333 B2 | 8/2004 | Lundt et al. |
| 7,306,508 B2 * | 12/2007 | Kawasaki et al. ............. 451/7 |
| 7,878,883 B2 * | 2/2011 | Gupta et al. ............. 451/7 |
| 2001/0018913 A1 * | 9/2001 | Ishida ............. 125/21 |
| 2002/0174861 A1 * | 11/2002 | Lundt et al. ............. 125/21 |
| 2004/0084042 A1 * | 5/2004 | McAulay et al. ............. 125/21 |
| 2006/0249134 A1 * | 11/2006 | Kawasaki et al. ............. 125/21 |

FOREIGN PATENT DOCUMENTS

| | | |
|---|---|---|
| JP | A-2003-1624 | 1/2003 |
| JP | A-2005-169605 | 6/2005 |
| JP | A-2007-320011 | 12/2007 |
| TW | 365688 | 8/1999 |
| WO | WO 00/43162 | 7/2000 |

OTHER PUBLICATIONS

Taiwanese Office Action issued Feb. 15, 2012 in Taiwanese Patent Application No. 097116880 (with partial translation).

Dec. 13, 2011 Office Action issued in Japanese Application No. 2007-152788 (with partial translation).

* cited by examiner (A)

(B)

(A)

(B)

SLICING METHOD AND A WIRE SAW APPARATUS

TECHNICAL FIELD

The present invention relates to a slicing method and a wire saw apparatus for slicing, e.g., a silicon ingot or an ingot of a compound semiconductor into many wafers by using a wire saw apparatus (or merely referred to as a wire saw).

BACKGROUND ART

In recent years, an increase in size of a wafer is demanded, and a wire saw is mainly used to slice an ingot with this increase in size.

The wire saw is an apparatus that causes a wire (a high-tensile steel wire) to travel at a high speed and presses an ingot (a work) against the wire to be sliced while applying a slurry to the wire, thereby slicing the ingot into many wafers at the same time (see Japanese Unexamined Patent Publication (Kokai) No. 262826-1997).

Here, FIG. 6 shows an outline of an example of a general wire saw.

As shown in FIG. 6, a wire saw 101 mainly includes a wire 102 that slices an ingot, grooved rollers 103 (wire guides) around which the wire 102 is wound, a means 104 for giving the wire 102 a tensile force, a means 105 for feeding the ingot to be sliced, and a means 106 for supplying a slurry at the time of slicing.

The wire 102 is unreeled from one wire reel 107 and reaches the grooved rollers 103 through the tensile-force-giving means 104 formed of a powder clutch (a constant torque motor 109), a dancer roller (a dead weight) (not shown) and so on through a traverser 108. The wire 102 is wound around this grooved rollers 103 for approximately 300 to 400 turns, and then taken up by a wire reel 107' through the other tensile-force-giving means 104'.

Further, the grooved roller 103 is a roller that has a steel cylinder of which a polyurethane resin is pressed in peripheral part and has grooves formed at a fixed pitch on a surface thereof, and the wound wire 102 can be driven in a reciprocating direction in a predetermined cycle by a driving motor 110.

It is to be noted that such an ingot-feeding means 105 as shown in FIG. 7 feeds the ingot to the wire 102 wound around the grooved rollers 103 at the time of slicing the ingot. This ingot-feeding means 105 includes an ingot-feeding table 111 that is used to feed the ingot, an LM guide 112, an ingot clamp 113 for grasping the ingot, a slice pad plate 114 and so on, and driving the ingot-feeding table 111 along the LM guide 112 under control of a computer enables feeding the ingot fixed at the end at a previously programmed feed speed.

Moreover, nozzles 115 are provided near the grooved rollers 103 and the wound wire 102, and a slurry can be supplied to the grooved rollers 103 and the wire 102 from a slurry tank 116 at the time of slicing. Additionally, a slurry chiller 117 is connected with the slurry tank 116 so that a temperature of the slurry to be supplied can be adjusted.

With the wire saw 101, an appropriate tensile force is applied to the wire 102 by the wire-tensile-force-giving means 104, and the ingot is sliced while the wire 102 is caused to travel in the reciprocating direction by the driving motor 110.

On the other hand, in a wafer, a size of a surface waviness component that is called "nano-topography" is a problem in recent years. This nano-topography is obtained by taking a wavelength component having a wavelength $\lambda=0.2$ mm to 20 mm that is shorter than "Sori" or "Warp" and longer than "surface roughness" out of a surface shape of a wafer. And, this nano-topography is very shallow waviness having a PV value of 0.1 µm to 0.2 µm or below. It is said that this nano-topography affects a yield of an STI (Shallow Trench Isolation) process in device manufacture.

Although the nano-topography is produced in a wafer processing step (slicing to polishing), it was revealed that a nano-topography caused due to wire saw slicing (i.e., slice waviness) can be classified into three types, i.e., "one that is extemporaneously produced", "one that is produced in a position where slicing is started or ended", and "one having a periodicity" as shown in FIG. 8.

Of these types, one that is produced in "slicing start/end portion of a wafer" has a high rate that it is rejected in a numeric judgment regarding a nano-topography. In particular, a nano-topography in the "slicing end portion" is larger than a nano-topography in the "slicing start portion". And the "slicing end portion" highly frequently becomes a position making a numeric value regarding a nano-topography the worst in a wafer radial direction or the nano-topography in the "slicing end portion" is rejected in the numeric judgment, and hence improvement is strongly demanded.

DISCLOSURE OF INVENTION

Thus, the present inventor examined nano-topographies in sliced wafers sliced by using such a conventional wire saw as shown in FIG. 6.

FIG. 9 shows Warp cross-sectional shapes measured by an electric capacitance type measuring instrument and "pseudo nano-topographies" of the sliced wafers. The pseudo nano-topography means obtaining a numeric value having a correlation with a nano-topography of a polished wafer in a pseudo manner by applying a bandpass filter having simulated processing characteristics of lapping, grinding, and polishing with respect to Warp cross-sectional wave shape of the sliced wafer.

In general, the nano-topography is measured after polishing but when a pseudo nano-topography is obtained from the sliced wafer and the obtained pseudo nano-topography is used, a cost and a time do not have to be increased, and a nano-topography caused due to an influence of slicing alone can be readily examined without being affected by a factor in a process such as polishing after slicing.

It was understood from such an examination that a nano-topography near a slicing end portion that is demanded to be improved the most in the conventional technology is caused due to a precipitous change in a Warp shape of a wafer in this position.

FIG. 9(A) shows a wafer holding small change in shape in a position near a slicing end portion as depicted in a shape map, and a size of a change of a pseudo nano-topography is suppressed to the range of ±0.1 µm and relatively small in the position near the slicing end portion as can be understood from the pseudo nano-topography. On the other hand, as shown in FIG. 9(B) or FIG. 9(C), it can be understood that, when a shape in the position near the slicing end portion is precipitously changed, a size of the pseudo nano-topography falls within the range of −0.3 to 0.4 in this position and is larger than that depicted in FIG. 9(A).

It is to be noted that, if a change in the entire shape is gentle even though this change is slightly large, the nano-topography is hardly degraded. A precipitous change in shape greatly affects the nano-topography.

Thus, a factor of generation of such a precipitous change in a sliced wafer in the position near the slicing end portion as shown in FIG. 9 was examined.

First, FIG. 10 shows an example of a change in shape of a sliced wafer, i.e., a slicing trajectory of the wire at the time of ingot slicing. As shown in FIG. 10, a trajectory of the wire greatly spreads on the outer side in slicing end portions near both ends of an ingot in particular, whereby a Warp cross-sectional shape of the sliced wafer is precipitously changed.

The present inventor conducted the following examination concerning a possibility of occurrence of such a cross-sectional shape (a slicing trajectory). As a result, it was revealed that a slicing trajectory formed by the wire is bent toward an end of the ingot when the ingot is contracted in an axial direction thereof in a time close to end of slicing as shown in FIG. 11 and that is a main factor of the posibility.

Such a conventional wire saw as depicted in FIG. 6 was used to slice a silicon ingot having a diameter of 300 mm and a length of 250 mm prepared for the test as examination method. A tensile force of 2.5 kgf was applied to the wire, and the wire was caused to travel in a reciprocating direction at an average speed of 500 m/min in a cycle of 60 s/c to perform slicing. Further, a supply, temperature of a slurry for slicing had a temperature profile depicted in FIG. 12(A). It is to be noted that a temperature was measured at both ends (positions having a slicing depth of 285 mm) of the ingot by using a thermocouple (see FIG. 12(B)).

FIG. 12(A) shows a result obtained by measuring a change in temperature of the ingot during a slicing process.

A temperature of the ingot was increased by 13° C. at maximum to become approximately 36° C. during the slicing process, and it was precipitously reduced by approximately 10° C. near a slicing end portion (a slicing depth of 275 mm to 300 mm in this example). This coincides with a position where the Warp shape suddenly changes near the slicing end portion. Additionally, it can be understood from calculation using a thermal expansion coefficient that the ingot is precipitously contracted by approximately 10 μm in the axial direction near the slicing end position.

It can be considered that this contraction occurs because as follows. First, as shown in FIG. 13, the slurry for slicing is rarely directly applied to the ingot and the ingot is hard to be cooled from start of slicing to a middle stage of slicing, and processing heat is stored in the ingot. Further, as shown in FIG. 14, when the ingot moves down with advancement of slicing, the slurry for slicing cooled to 22° C. to 24° C. is directly applied to the ingot near the slicing end portion, and besides a slicing load is reduced to ½ or below of a maximum value, and therefore, a temperature of the ingot is rapidly reduced to the same temperature as that of the slurry for slicing.

It is to be noted that the temperature of the ingot that is once decreased, is again increased at a slicing depth 200 mm or a further depth in FIG. 12(A) because a flow quantity of the slurry is reduced here.

With the above-explained examination, the present inventor discovered that controlling a temperature of the ingot during a slicing process in such a manner that rapid cooling of the ingot near the slicing end portion does not occur is important in order to improve a nano-topography caused due to a precipitous change in Warp shape in a position near a slicing end portion.

Here, to control a temperature of the ingot at the time of slicing, a publication No. WO00/43162 discloses a method of supplying a slurry for slicing to a grooved rollers (a nozzle 115 of a slurry for slicing) and supplying a slurry for adjusting an ingot temperature that is used to adjust a temperature of the ingot to the ingot (a nozzle 115' of a slurry for adjusting an ingot temperature) at the time of slicing the ingot. FIG. 15 shows an explanatory views for explaining a slurry for slicing and a slurry for adjusting an ingot temperature.

However, the present inventor examined a sliced wafer obtained by such a conventional method and thereby discovered that an accuracy of a wafer thickness is three times to twenty times of that in standard conditions and thickness uniformity is considerably degraded in a central region of the wafer. FIG. 16 shows a thickness shape of a sliced wafer obtained by a conventional method. It is actually hard to use such a wafer as a product.

Thus, the present inventor repeatedly keenly studied about a method that can reduce rapid cooling by controlling a temperature of the ingot and a change in wafer thickness in the publication No. WO00/43162, and thereby found that adopting the conventional method of slicing the ingot shown in FIG. 15 causes great interference of the slurry for slicing and the slurry for adjusting an ingot temperature to disorder flows of these slurries when slicing advances to slice a central region of the ingot, thus greatly affecting a sliced shape in the central region of the ingot. FIG. 17 show explanatory views of interference of these slurries. As a result, such a sliced wafer in which an accuracy of a thickness in the central region considerably deviates from standard conditions as shown in FIG. 16 is obtained.

Therefore, in view of the above-explained problems, it is an object of the present invention to provide a method for alleviating rapid cooling of an ingot especially in a time close to end of slicing the ingot, consequently suppressing degradation of a nano-topography, and slicing into high-quality wafers having a uniform thickness when slicing the ingot by using a wire saw.

It is another object of the present invention to provide a wire saw apparatus which is capable of suppressing degradation of a nano-topography and slicing into high-quality wafers having a uniform thickness.

To achieve this object, the present invention provides a slicing method including winding a wire around a plurality of grooved rollers and pressing the wire against an ingot to be sliced into wafers while supplying a slurry for slicing to the grooved rollers and causing the wire to travel in a reciprocating direction, wherein the ingot is sliced with controlling a temperature of the ingot by supplying a slurry for adjusting an ingot temperature to the ingot independently from the slurry for slicing while the slurry for adjusting an ingot temperature is supplied to the ingot only at the exit side of the wire caused to travel in the reciprocating direction.

In this manner, first, the ingot is sliced with controlling a temperature of the ingot by supplying a slurry for adjusting an ingot temperature of which a supply temperature is controlled to the ingot to be sliced independently from the slurry for slicing, and thus rapid cooling of the ingot that occurs in the time close to end of slicing can be thereby alleviated, and occurrence of precipitous changes in slicing trajectory and Warp shape can be suppressed, thereby a nano-topography in the sliced wafer can be improved.

Moreover, supplying the slurry for adjusting an ingot temperature to the ingot only at the exit side of the wire caused to travel in the reciprocating direction at the time of slicing enables slicing the ingot into wafers having a uniform thickness. This is because even if the slurry for adjusting an ingot temperature interferes with the slurry for slicing and flows of these slurries are greatly disordered, the disorder occurs only at the exit side of the wire since, in the first place, the slurry for adjusting an ingot temperature is supplied to the ingot only at the exit side of the wire caused to travel in the reciprocating.

Moreover, since the disorder occurs only at the exit side of the wire, the disorder of the slurries that occurs at the exit side of the wire does not strongly affect slicing of the ingot itself. Therefore, a sliced shape of the ingot is not greatly disordered and degradation of an accuracy of a thickness in the central region in such as conventional method can be suppressed.

In this way, a high-quality sliced wafer having a high wafer thickness uniformity in which degradation of a nano-topography is suppressed can be obtained.

In this case, it is preferable that the slurry for adjusting an ingot temperature is supplied while a supply temperature thereof is increased from start of slicing; the supply temperature of the slurry for adjusting an ingot temperature when the slicing depth of the ingot reaches at least ⅔ of the diameter becomes equal to a temperature of the ingot, and then the slurry for adjusting an ingot temperature is supplied while the supply temperature is gradually reduced.

When the slurry for adjusting an ingot temperature is supplied under such temperature control, rapid cooling of the ingot, especially, near the slicing end portion can be very efficiently alleviated without rapidly changing a temperature of the ingot during a slicing process.

Further, in this case, it is preferable that after the slicing depth of the ingot reaches at least ⅔ of the diameter, the supply temperature of the slurry for adjusting an ingot temperature is gradually reduced to be equal to the supply temperature of the slurry for slicing at end of slicing.

When the temperature of the slurry for adjusting an ingot temperature is set to be equal to the supply temperature of the slurry for slicing at the end of slicing as explained above, excessive cooling can be avoided in the time close to end of slicing of the ingot, and the temperature of the ingot can be further smoothly reduced to the temperature of the slurry for slicing, thus further occurrence of rapid cooling of the ingot can be further effectively reduced.

Further, the present invention provides a wire saw apparatus for slicing an ingot into wafers having at least: a plurality of grooved rollers around which a wire is wound; a means for supplying a slurry for slicing to the grooved rollers; and a means for supplying a slurry for adjusting an ingot temperature to the ingot to be sliced, a temperature of the slurry for adjusting an ingot temperature is controlled independently from the slurry for slicing, the wire saw apparatus in which the ingot is pressed against the wire to be sliced into wafers while a slurry for slicing is supplied to the grooved rollers by the means for supplying a slurry for slicing; a slurry for adjusting an ingot temperature is supplied to the ingot by the means for supplying a slurry for adjusting an ingot temperature; the wire is caused to travel in a reciprocating direction, wherein the wire saw apparatus has further a means for controlling a supply position of the slurry for adjusting an ingot temperature and the means for a supply position of the slurry for adjusting an ingot temperature is capable of controlling to supply the slurry for adjusting an ingot temperature to the ingot to be sliced only at the exit side of the wire caused to travel in the reciprocating direction.

In this manner, first, since the wire saw apparatus of the present invention has a means for supplying a slurry for adjusting an ingot temperature to the ingot to be sliced, the wire saw apparatus can slice the ingot with controlling a temperature of the ingot and can suppress occurrence of precipitous changes in slicing trajectory, Warp shape and degradation of a nano-topography.

Further, since the wire saw apparatus has a means for controlling a supply position of the slurry for adjusting an ingot temperature and the means for a supply position of the slurry for adjusting an ingot temperature is capable of controlling to supply the slurry for adjusting an ingot temperature to the ingot to be sliced only at the exit side of the wire caused to travel in the reciprocating direction, the wire saw apparatus can restrict a position where the slurry for adjusting an ingot temperature interferes with the slurry for slicing to greatly disorder flows of these slurries to the only position at the exit side of the wire, and can slice into a high-quality wafer having a high thickness uniformity without greatly disordering a sliced shape of the ingot.

In this case, it is possible that the means for a supply position of the slurry for adjusting an ingot temperature has a switching valve and the slurry for adjusting an ingot temperature is supplied to the ingot to be sliced only at the exit side of the wire by a changeover of the switching valve.

If the means for a supply position of the slurry for adjusting an ingot temperature has the switching valve as mentioned above, the wire saw apparatus can easily control to supply the slurry for adjusting an ingot temperature to the ingot to be sliced only at the exit side of the wire by a periodical changeover of the switching valve.

The slicing method and the wire saw apparatus according to the present invention can alleviate rapid cooling of the ingot that occurs especially in the time close to end of slicing and can obtain a high-quality wafer having a uniform thickness in which degradation of a nano-topography and an accuracy of a wafer thickness in the central region are suppressed.

BRIEF DESCRIPTION OF DRAWINGS

FIGS. 2A and 2B are graphs each showing a supply temperature profile of a slurry in the slicing method of the present invention, wherein FIG. 2(A) shows a supply temperature profile of a slurry for slicing and FIG. 2(B) shows the same of a slurry for adjusting an ingot temperature;

FIG. 5 are graphs each showing a level of a pseudo nano-topography, wherein FIG. 5(A) shows a result of Example and FIG. 5(B) shows a result of Comparative Example 1;

FIG. 12 show a test result about a possibility of contraction of the ingot in an axial direction, wherein FIG. 12(A) is a graph showing a temperature change of the ingot during slicing and a supply temperature profile of a slurry for slicing and FIG. 12(B) is an explanatory view for explaining a measurement method for a temperature of the ingot;

FIG. 17 are explanatory views for explaining an interference of the slurry for slicing and the slurry for adjusting an ingot temperature, wherein FIG. 17(A) shows the time of starting slicing and FIG. 17(B) shows a moment where a central region of an ingot is sliced.

BEST MODES FOR CARRYING OUT THE INVENTION

Although an embodiment according to the present invention will be explained hereinafter, but the present invention is not restricted thereto.

Figure 15:
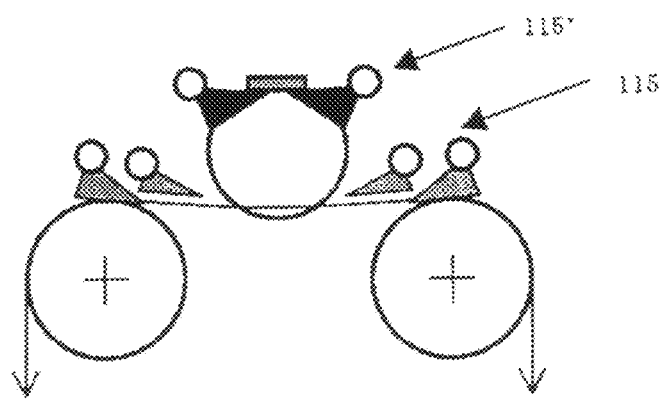
FIG. 15 is an explanatory view for explaining a nozzle of a slurry for slicing and a nozzle of a slurry for adjusting an ingot temperature.

As explained above, in order to prevent rapid cooling of the ingot near the slicing end portion, for example, a publication No. WO00/43162 discloses a method for supplying a slurry for slicing to a grooved rollers and supplying a slurry for adjusting an ingot temperature that is used to adjust a temperature of the ingot to the ingot at the time of slicing the ingot (see FIG. 15). However, the method degrades considerably thickness uniformity in a central region of the wafer.

The present inventor discovered that influence on the sliced shape by disorder of the flows that occurs due to interference of the slurry for slicing and the slurry for adjusting an ingot temperature during slicing the ingot causes degradation of thickness uniformity of the wafer.

Furthermore, the present inventor discovered that when the slurry for adjusting an ingot temperature is supplied to the ingot only at the exit side of the wire rather than both at the exit side and at the entry side of the wire, which is caused to travel in the reciprocating and slices the ingot like a conventional method, even if the slurry for adjusting an ingot temperature interferes with the slurry for slicing to disorder the flows, the disorder occurs only at the exit side of the wire, occurrence of the disorder at the entry side of the wire is prevented, the disorder of the slurries does not strongly affect slicing of the ingot, and as a result, degradation of an accuracy of a thickness in the central region of the ingot can be thus prevented, thereby bringing the present invention to completion.

First, a wire saw according to the present invention will now be explained in detail hereinafter with reference to the drawings, but the present invention is not restricted thereto.

Figure 1:
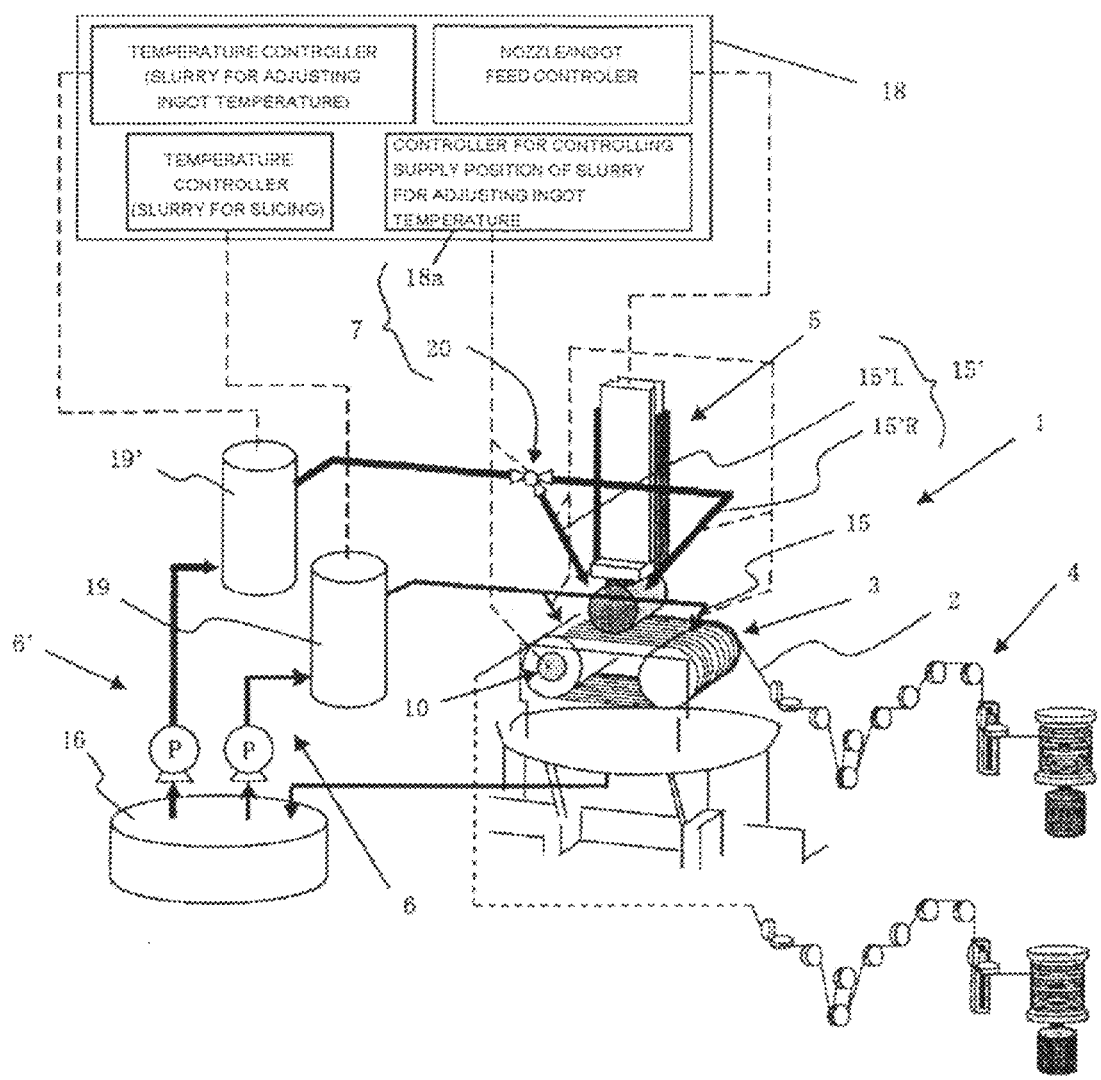
FIG. 1 is a schematic view showing an example of a wire saw that can be used in a slicing method according to the present invention.

FIG. 1 shows an example of a wire saw apparatus according to the present invention.

As shown in FIG. 1, a wire saw apparatus 1 according to the present invention mainly includes a wire 2 to slice an ingot, grooved rollers 3, wire-tensile-force-giving means 4, an ingot-feeding means 5, a means for supplying a slurry for slicing 6, a means for supplying a slurry for adjusting an ingot temperature 6' and a means for controlling a supply position of a slurry for adjusting an ingot temperature 7.

Here, the means for supplying a slurry for slicing 6, i.e., a means that supplies the slurry for slicing to the grooved rollers 3 (the wire 2), will be first explained. In this means for supplying a slurry for slicing 6, a slurry tank 16 is connected with nozzles (a nozzle of a slurry for slicing) 15 through a heat exchanger (for a slurry for slicing) 19 controlled by a temperature controller (a slurry for slicing) of a' computer 18. A supply temperature of the slurry for slicing can be controlled by the heat exchanger 19 and the slurry can be supplied to the grooved rollers 3 from the nozzles 15.

Moreover, in the means for supplying a slurry for adjusting an ingot temperature 6', i.e., a means that directly supplies a slurry (a slurry for adjusting an ingot temperature) to the ingot to be sliced in order to adjust an temperature of the ingot, the slurry tank 16 is connected with nozzles (a nozzle of a slurry for adjusting an ingot temperature) 15' through a heat exchanger (for a slurry for adjusting an ingot temperature) 19' controlled by a temperature controller (a slurry for adjusting an ingot temperature) of the computer 18. A supply temperature of the slurry for adjusting an ingot temperature can be controlled by the heat exchanger 19' and supplied to the ingot from the nozzles 15'.

In this manner, the wire saw apparatus 1 according to the present invention can supply the slurry for slicing and the slurry for adjusting an ingot temperature through heat exchangers 19, 19' respectively that are different from each other and can separately control supply temperatures of the slurry for slicing and the slurry for adjusting an'ingot temperature.

Therefore, the slurry for adjusting an ingot temperature can be supplied with independently adjusting a supply temperature thereof by the means for supplying a slurry for adjusting an ingot temperature 6' and a temperature of the ingot during a slicing process can be controlled. And thereby occurrence of precipitous changes in slicing trajectory and Warp shape due to a rapid change in temperature of the ingot can be prevented. Therefore, degradation of a nano-topography caused due to these can be suppressed.

It is to be noted that the present invention is not of course restricted to the structure depicted in FIG. 1 and a structure that separately controls temperatures of the slurries in respective tanks, i.e., supply temperatures of the slurries can be achieved by arranging the separate slurry tanks and connecting slurry chillers for the respective slurry tanks. A mechanism that can independently control supply temperatures of the slurry for slicing and the slurry for adjusting an ingot temperature can suffice.

These types of slurries are not restricted in particular, and the same types as those in the conventional example can be used. For instance, a slurry obtained by dispersing GC (silicon carbide) abrasive grains in a liquid can be used.

A means for controlling a supply position of the slurry for adjusting an ingot temperature 7 will be explained. The means for controlling a supply position of the slurry for adjusting an ingot temperature 7 can include, for example, mainly a switching valve 20, a controller for controlling a supply position of the slurry for adjusting an ingot temperature 18a of the computer 18.

Here, the switching valve 20 is arranged between the heat exchanger 19' and nozzles 15' as shown in FIG. 1. The switching valve 20 is a valve to control the slurry for adjusting an ingot temperature delivered from the slurry tank 16 through the heat exchanger 19' by switching supply directions to a direction of the nozzle 15'L or the nozzle 15'R or both thereof. It is to be noted that a left side nozzle of the nozzles 15' is the nozzle 15'L and a right side nozzle of the nozzles 15' is the nozzle 15'R as viewed from a front of the wire saw apparatus 1 (i.e., a front side of FIG. 1).

If the means for a supply position of the slurry for adjusting an ingot temperature has the switching valve 20, supply directions of the slurry for adjusting an ingot temperature can be easily and reliably controlled by a changeover of the switching valve 20. It is to be noted that a conventionally utilized valve can be adopted.

Further, the switching valve 20 and a driving motor 10 that causes a wire 2 to travel are connected with the computer 18. The controller for controlling a supply position of the slurry for adjusting an ingot temperature 18a controls in such a manner that the switching valve 20 is automatically switched in accordance with drive of the driving motor 10.

To explain it specifically, for example, in the case that the wire 2 is caused to travel from a right side to a left side as viewed from a front of the wire saw apparatus 1 by the driving motor 10 and the ingot is sliced, in response to the traveling direction of the wire 2, the controller for controlling a supply position of the slurry for adjusting an ingot temperature 18a can send a signal that switches the valve to open only the side of the left nozzle 15-'L to the switching valve 20. As a result, the slurry for adjusting an ingot temperature is delivered to the left nozzle 15'L and is supplied only at a left side of the ingot, i.e., only at a side where the wire 2 slicing the ingot exits from the ingot (a exit side of the wire 2) in the case.

Further, in the case that the wire 2 is caused to travel from a left side to a right side and the ingot is sliced, in response to the traveling direction of the wire 2, the controller for controlling a supply position of the slurry for adjusting an ingot temperature 18a can send a signal that switches the valve to open only the side of the right nozzle 15'R to the switching valve 20. As a result, the slurry for adjusting an ingot temperature is delivered to the right nozzle 15'R and is supplied only at a right side of the ingot, i.e., only at a side where the wire 2 slicing the ingot exits from the ingot equally in the case.

In this manner, the wire saw apparatus 1 of the present invention includes the means for controlling a supply position of the slurry for adjusting an ingot temperature 7 and, at least, is capable of controlling to supply the slurry for adjusting an ingot temperature to the ingot only at the exit side of the wire 2 caused to travel in the reciprocating direction. As a result, the wire saw apparatus 1 of the present invention is capable of not supplying the slurry for adjusting an ingot temperature at a side where the wire 2 enters into the ingot (a entry side of the wire 2) and supplying the slurry for adjusting an ingot temperature only at the exit side of the wire 2 even if the slurry for adjusting an ingot temperature is supplied in addition to the slurry for slicing at the time of slicing. Thus, great interference of the slurry for slicing and the slurry for adjusting an ingot temperature at the entry side of the wire 2, which conventionally occurs, does not occur. Furthermore, disorder of the flows due to interference between these slurries does not occur. And thereby great disorder of a sliced shape of the ingot is efficiently prevented. On the other hand, even if the slurry for adjusting an ingot temperature greatly interferes with the slurry for slicing to disorder the flows, a sliced shape of the ingot is not greatly affected because the position of the interference is the side where the wire 2 slices the ingot to exit therefrom. Therefore, the wire saw apparatus 1 of the present invention can slice into wafers having a uniform thickness without degrading an accuracy of a thickness in the central region of the wafer.

However, a function of the means for controlling a supply position of the slurry for adjusting an ingot temperature 7 is not restricted to the control that open only one of the switching valve 20. Moreover, for example, a signal that switches the valve to open both sides of the right and left nozzles 15'L, 15'R can be sent and the slurry for adjusting an ingot temperature can be supplied from both nozzle 15'L and nozzle 15'R as needed. For example, in the case that an initial temperature of the ingot is adjusted before start of slicing, a temperature of the ingot can be quickly set to a preset temperature by supplying the slurry for adjusting an ingot temperature from both nozzle 15'L and nozzle 15'R.

It is to be noted that the means for controlling a supply position of the slurry for adjusting an ingot temperature 7 is not restricted to using the switching valve 20. For example, the slurry for adjusting an ingot temperature can be delivered from the slurry tank 16 toward nozzle 15'L and nozzle 15'R through different lines respectively, each line can have a valve separately and a supply position of the slurry for adjusting an ingot temperature can be controlled by controlling a opening and a closing of each valve.

A nozzle/ingot feed controller of the computer 18 is connected with the nozzles 15 that supply the slurry for slicing and the ingot-feeding means 5. And the slurry for slicing can be automatically supplied to the grooved rollers 3 in predetermined amounts and at predetermined timings from the nozzles 15 in response to a predetermined feeding amount of the ingot, i.e., a predetermined slicing amount of the ingot by using a preset program.

Further, the nozzle/ingot feed controller of the computer 18 is also connected with the nozzles 15' that supply the slurry for adjusting an ingot temperature. The supply of the slurry for adjusting an ingot temperature is programmed in view of timings and supply positions (the nozzle 15'L and the nozzle 15'R) according to the traveling direction of the wire 2.

Figure 6:
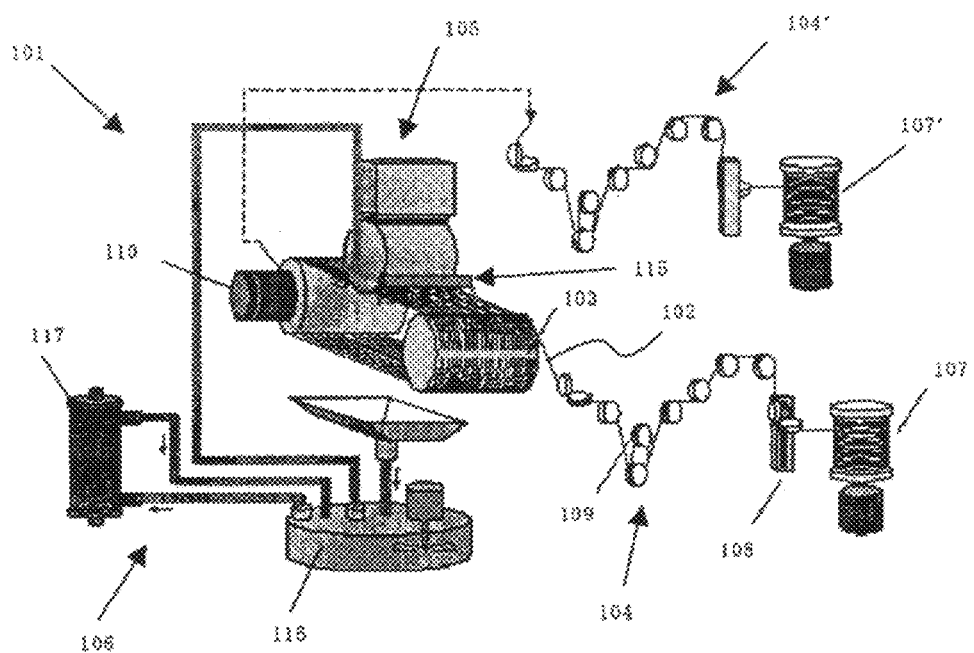
FIG. 6 is a schematic view showing an example of a conventional wire saw.
Figure 7:
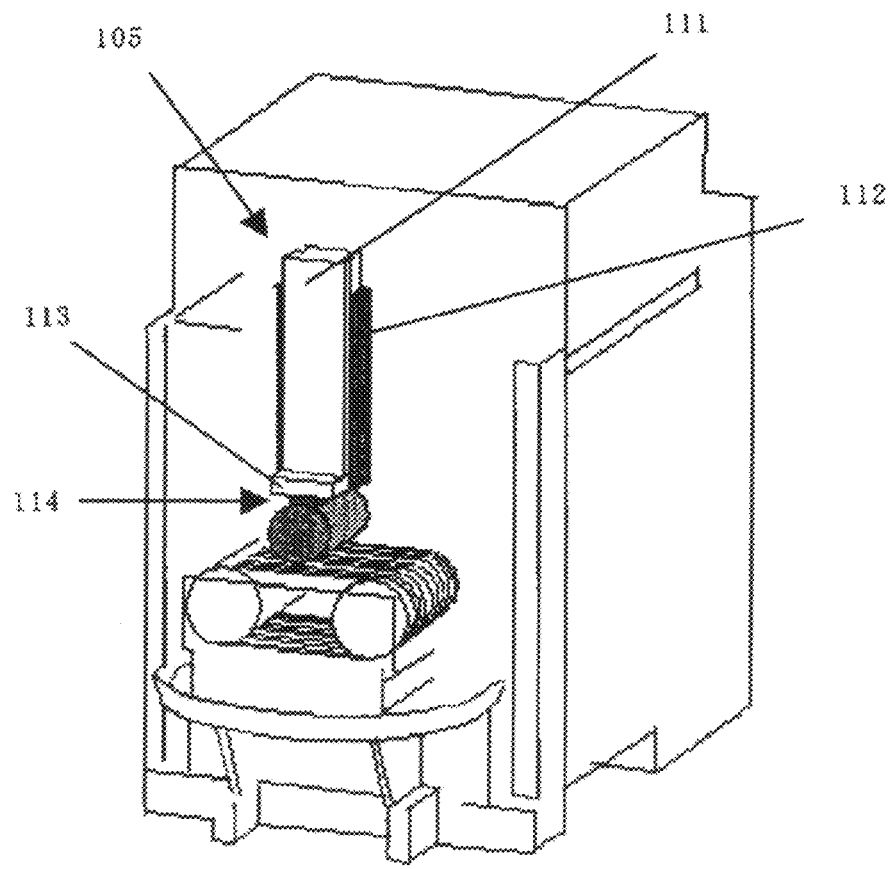
FIG. 7 is a schematic view showing an example of an ingot-feeding means.
Figures 8, 9:
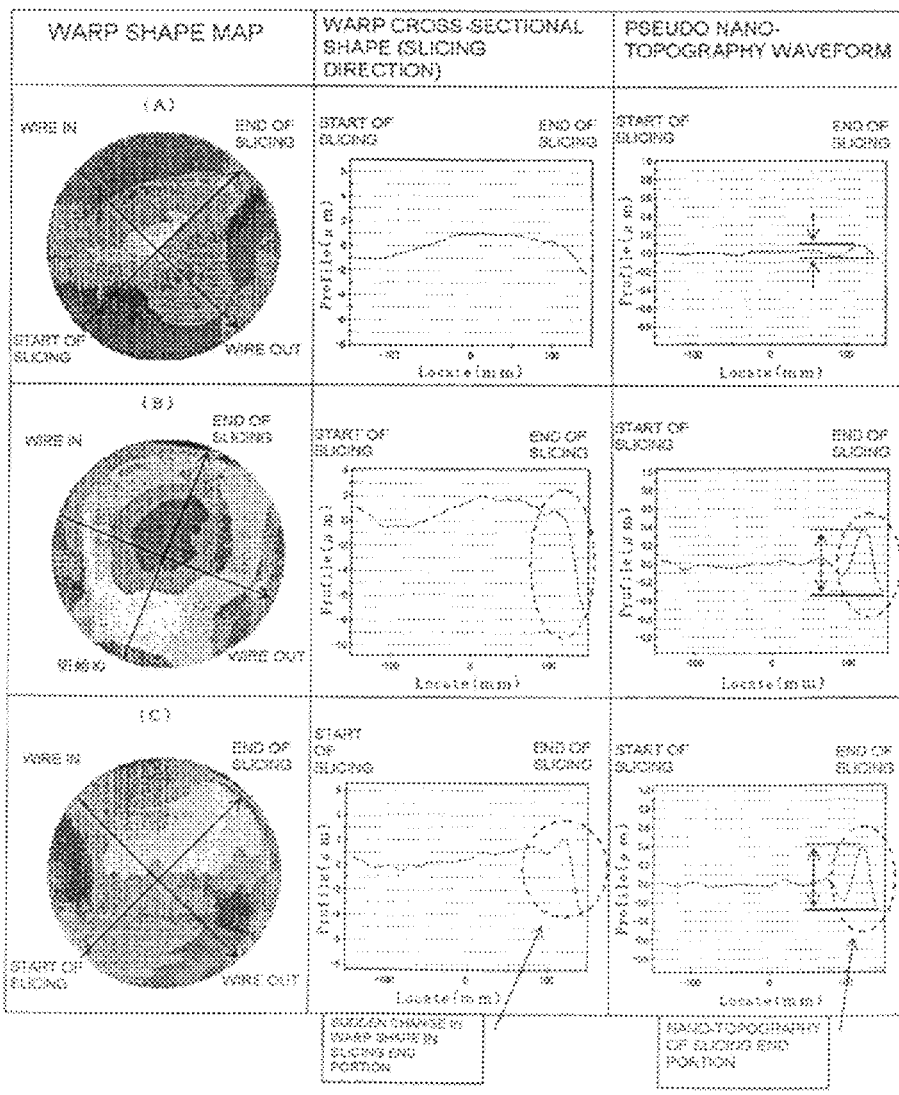
FIG. 8 is an explanatory view showing classification of nano-topographies caused due to wire saw slicing.
FIG. 9 is a measurement view of Warp cross-sectional shapes and pseudo nano-topography waveforms of sliced wafers.
Figure 10:
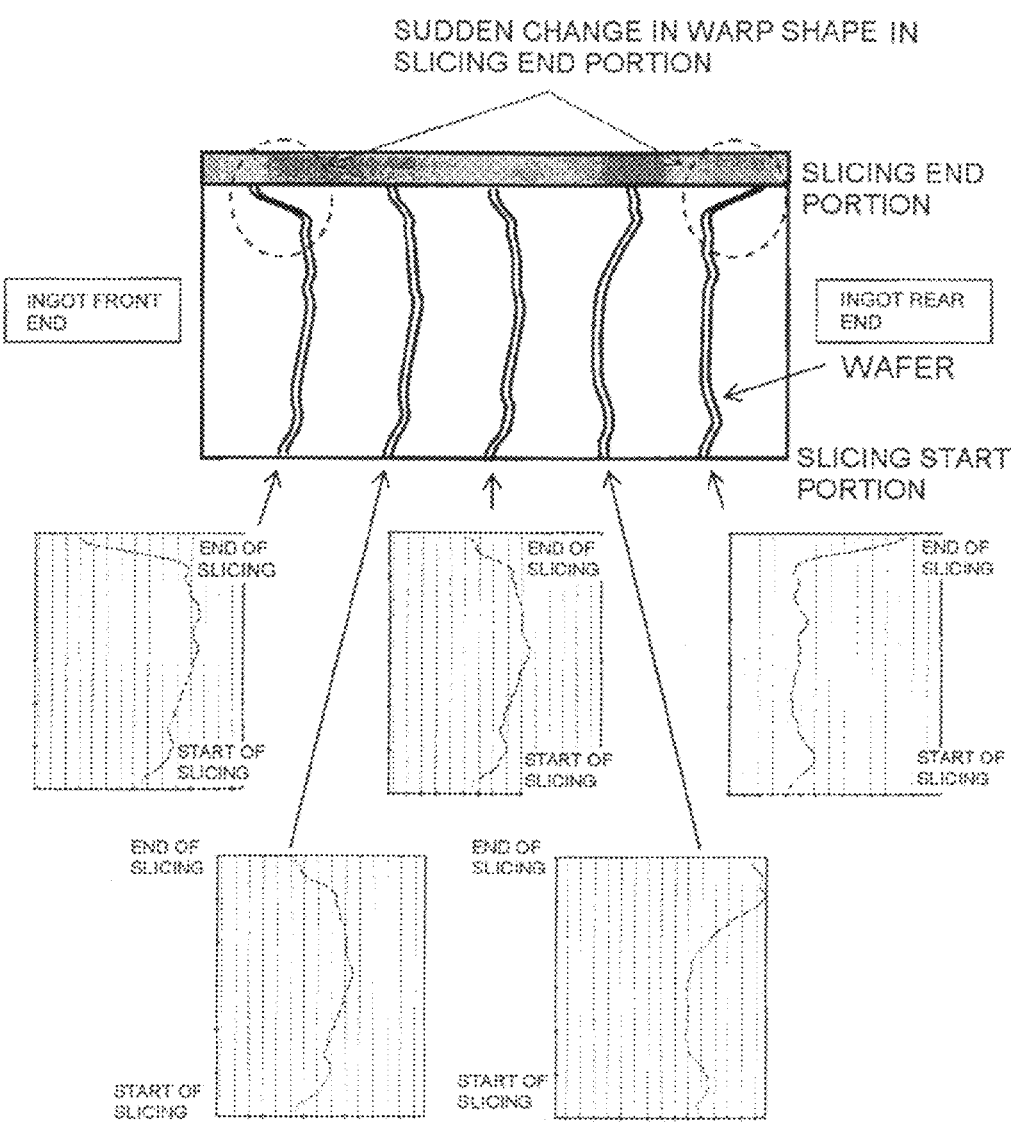
FIG. 10 is a schematic view showing an example of slicing trajectories of a wire at the time of slicing an ingot.
Figure 11:
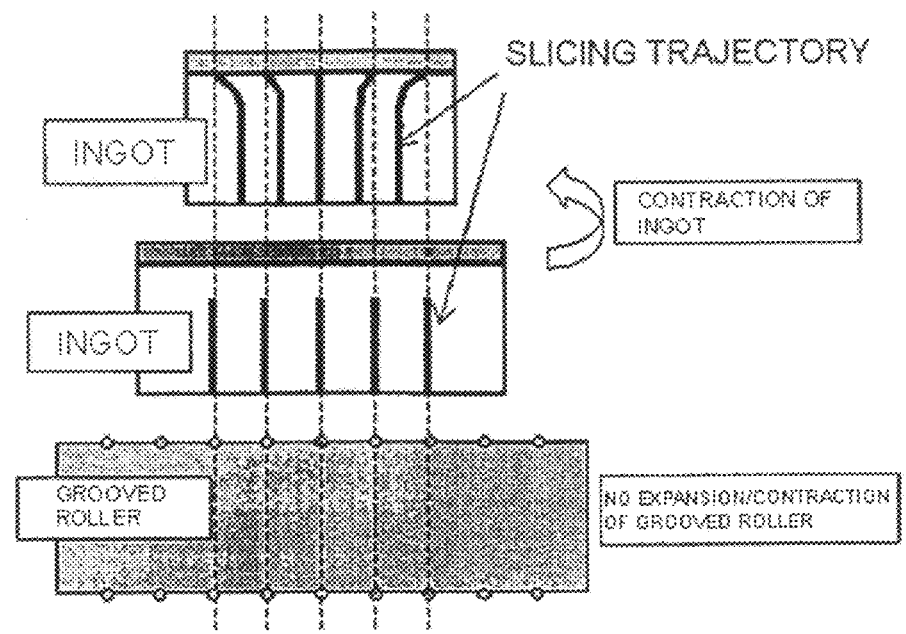
FIG. 11 is an explanatory view showing an example of contraction of an ingot and slicing trajectories at the time of slicing the ingot.

Furthermore, the wire 2, the grooved rollers 3, the wire-tensile-force-giving means 4, and the ingot-feeding means 5 can be the same as those in the conventional wire saw 101 depicted in FIG. 6.

A type and a thickness of the wire 2, a groove pitch of the grooved roller 3, a structure in any other means, and so on are not restricted in particular, and they can be determined each time so that desired slicing conditions can be obtained in accordance with the conventional wire saw.

The wire 2 can be formed of, e.g., a special piano wire having a width of approximately 0.13 mm to 0.18 mm, and the grooved roller 3 having a groove pitch of (a desired wafer thickness+a slicing removal) can be adopted.

A procedure of carrying out the slicing method according to the present invention by using such a wire saw 1 according to the present invention will now be explained hereinafter.

First, the ingot-feeding means 5 is used to feed a grasped ingot toward a lower position at a predetermined speed, and the grooved rollers 3 are driven, thereby causing the wire 2 to which a tensile force is given by the wire-tensile-force-giving means 4 to travel in a reciprocating direction. It is to be noted that a magnitude of the tensile force given to the wire 2, a traveling speed of the wire 2, and so on at this time can be appropriately set. For example, a tensile force of 2.5 kgf to 3.0 kgf can be applied to cause the wire 2 to travel in the reciprocating direction at an average speed of 400 m/min to 600 m/min in a cycle of 1 c/min to 2 c/min (30 s/c to 60 s/c). These values can be determined in accordance with, e.g., the ingot to be sliced.

Furthermore, although the nozzles 15 are used to start supplying the slurry for slicing toward the grooved rollers 3 and the wire 2, a supply temperature and others of this slurry can be also freely set. For example, an approximately room temperature (25° C.) can be set.

Figure 2A:
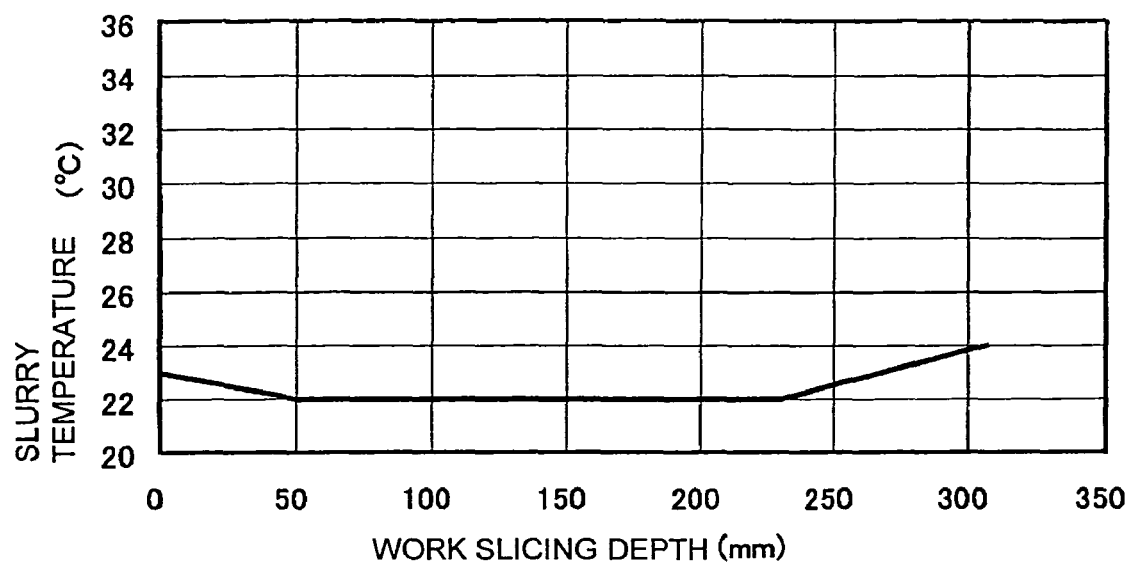

FIG. 2(A) shows an example of a supply temperature profile of the slurry for slicing in the slicing method of the present invention. It is to be noted that the slurry for slicing with such supply temperature profile can be supplied, but the present invention is not restricted thereto.

Further, the slurry for adjusting an ingot temperature is directly supplied to the ingot from the nozzle 15'L or the nozzle 15'R. At this time, the slurry is supplied with controlling supply positions of the slurry for adjusting an ingot temperature by the means for controlling a supply position of the slurry for adjusting an ingot temperature 7. That is, in response to the traveling direction of the wire 2, the switching valve 20 is automatically switched to deliver the slurry for adjusting an ingot temperature only to the nozzle located at the exit side of the wire 2 by the controller for controlling a supply position of the slurry for adjusting an ingot temperature 18a. And thereby the supply positions of the slurry for adjusting an ingot temperature is controlled and the slurry for adjusting an ingot temperature is supplied to the ingot only at the exit side of the wire 2.

As explained above, the slicing method according to the present invention can supply the slurry for adjusting an ingot temperature only at the exit side of the wire 2, and hence during a slicing process, supply of the slurry for adjusting an ingot temperature at the entry side of the wire can be prevented, occurrence of disorder of the flows of the slurries by interference between the slurry for slicing and the slurry for adjusting an ingot temperature can be suppressed and great influence on the sliced shape of the ingot can be prevented. Thus, the degradation of thickness uniformity in a central region of the wafer caused due to great interference between the slurries is effectively prevented.

Even if interference between the slurries occurs at the exit side of the wire 2, because the position of the interference is the position of the wire portion after finishing slicing the ingot, of course, the interference in the traveling direction of the wire 2 is not related to slicing of the ingot, and the sliced shape and thus the thickness of the wafer are not greatly affected.

Figure 2B:
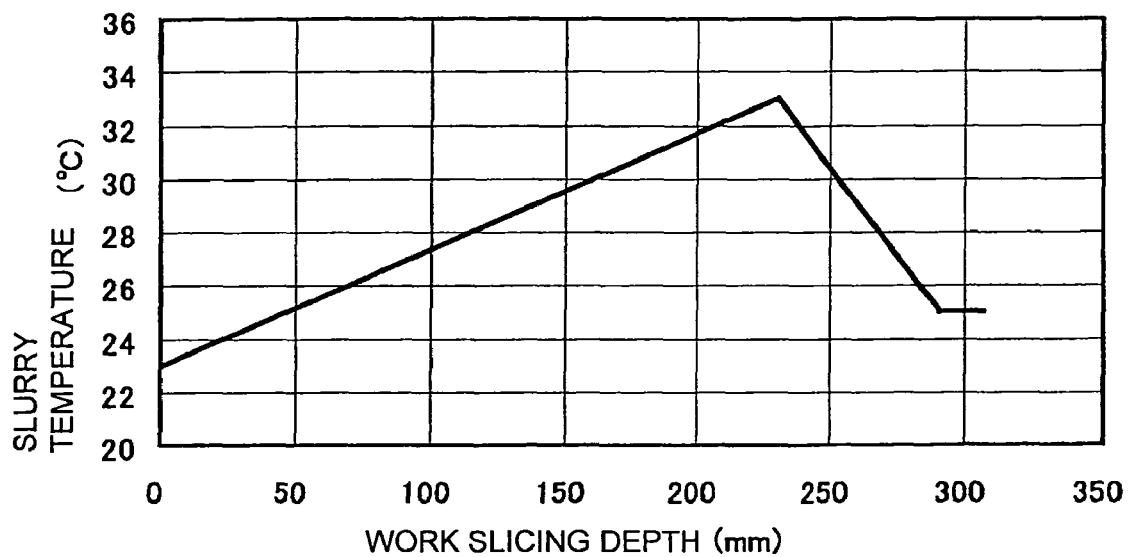

It is to be noted that a temperature profile of the slurry for adjusting an ingot temperature in a slicing process can be set, for example, as shown in FIG. 2(B). Here, the temperature profile of the slurry for adjusting an ingot temperature will be explained.

In the slicing method of the present invention, as shown in FIG. 2(B), it is preferable that the temperature is gradually increased after supply is started at, for example, approximately room temperature. This corresponds to a temperature of the ingot that gradually increases with slicing, and thereby, it can be prevented that the ingot is excessively cooled and is precipitously changed by the slurry for adjusting an ingot temperature.

And, it is preferable that the slurry for adjusting an ingot temperature is supplied in such a manner that the supply temperature of the slurry when the slicing depth of the ingot reaches at least ⅔ of the diameter becomes equal to a temperature of the ingot and then the slurry for adjusting an ingot temperature is supplied while the supply temperature is gradually reduced. Furthermore, it is preferable that the supply temperature thereof becomes equal to that of the slurry for slicing at end of slicing.

When the slicing depth of the ingot reaches at least ⅔ of the diameter, a slicing load is reduced and the slurry for slicing at approximately 22° C. to 24° C. is directly supplied. At this time, the temperature of the ingot during a slicing process can be slowly cooled without rapidly changing the temperature of the ingot by directly supplying the slurry for adjusting an ingot temperature at the same temperature as that of the ingot and thereafter supplying the slurry for adjusting an ingot temperature while the supply temperature is gradually reduced.

Further, when the temperature of the slurry for adjusting an ingot temperature is set to be equal to that of the slurry for slicing at the end of slicing, excessive cooling of the ingot by the slurry for adjusting an ingot temperature can be prevented.

When the slurry for adjusting an ingot temperature is supplied with the temperature profile as explained above, precipitous changes in slicing trajectory near a slicing end portion, which is especially a conventional problem, can be prevented, a position where a Warp shape precipitously varies can be eliminated in each obtained sliced wafer and a nano-topography can be greatly improved.

It is to be noted that the temperature profile of the slurry for adjusting an ingot temperature is not restricted in particular to the pattern shown in FIG. 2(B), and it can be determined each time according to a type of the ingot to be sliced, a supply temperature of the slurry for slicing or the like.

When the ingot is sliced by the slicing method according to the present invention as explained above, degradation of a nano-topography that conventionally occurs near a slicing end portion can be suppressed, great degradation of a sliced shape in the central region of the wafer can be prevented and high-quality wafers in which an accuracy of a wafer thickness return to a normal revel can be obtained.

The present invention will be explained in more detail based on examples, but the present invention is not restricted thereto.

EXAMPLE

A wire saw according to the present invention shown in FIG. 1 was used to cut a silicon ingot having a diameter of 300 mm and an axial length of 200 mm into wafers based on the slicing method according to the present invention, thereby 190 sliced wafers were obtained.

A wire having a diameter of 160 μm was used, and a tensile force of 2.5 kgf was applied to cause the wire to travel in a reciprocating direction at an average speed of 500 m/min in a cycle of 60 s/c, thereby slicing was performed.

In this case, the slurry for slicing was supplied from start of slicing, and it was supplied to grooved rollers with a temperature profile depicted in FIG. 2(A).

Furthermore, the slurry for adjusting an ingot temperature is supplied to the ingot only at the exit side of the wire. That is, the slurry for adjusting an ingot temperature is supplied with the temperature profile shown in FIG. 2(B) from start of slicing so that it is sprayed only from the right nozzle 15'R in the case that the wire is caused to travel from a left side to a right side as viewed from a front of the wire saw apparatus (a front side of FIG. 1), on the other hand, it is supplied only from the left nozzle 15'L in the case that the wire is caused to travel from a right side to a left side.

Figure 12:
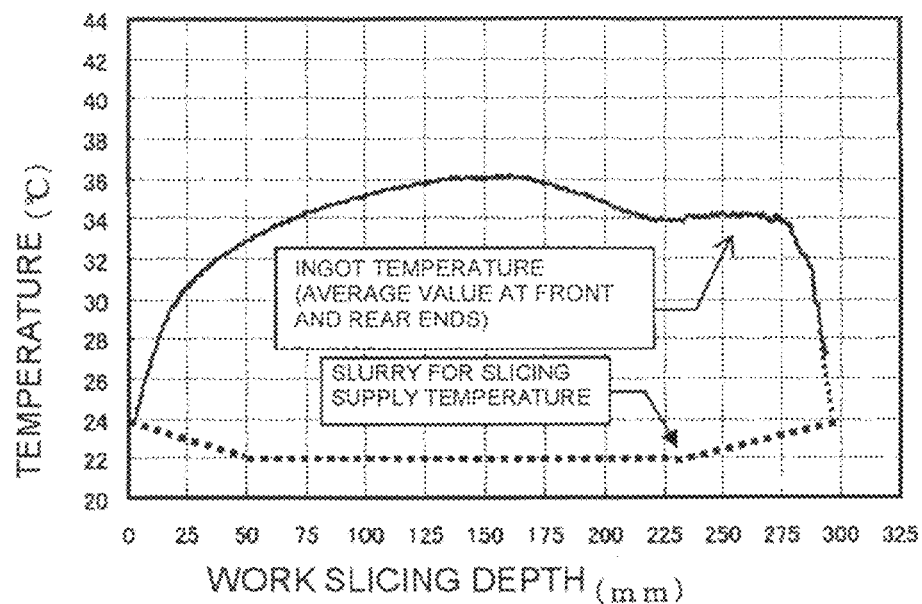
Figure 12:
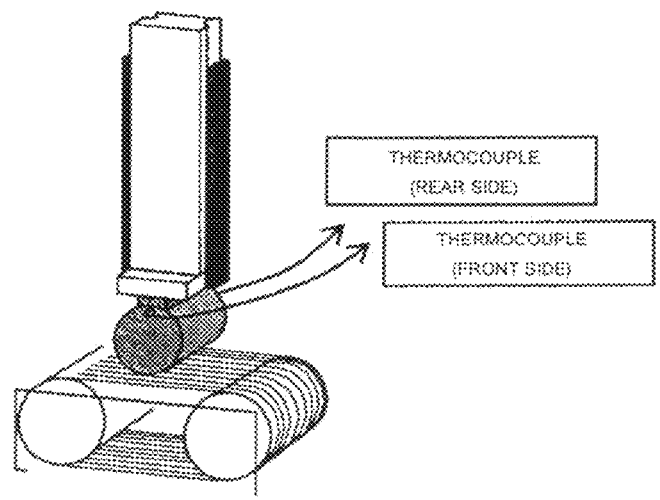
Figure 13:
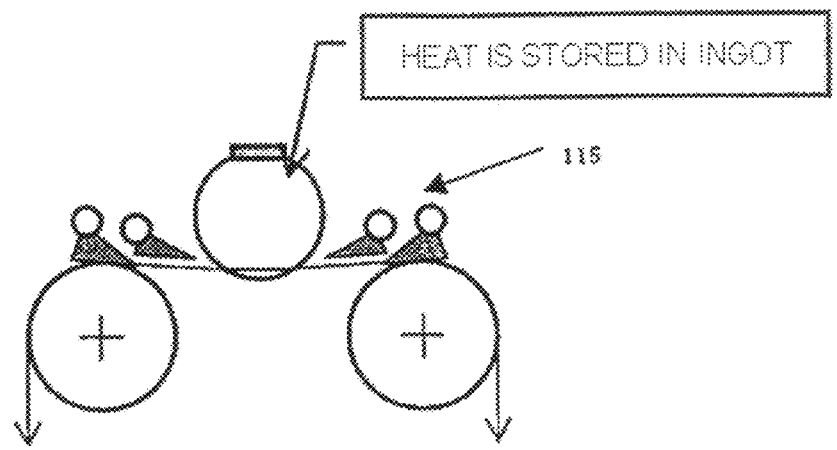
FIG. 13 is an explanatory view showing a relationship between the ingot at the time of starting slicing and the slurry for slicing.
Figure 14:
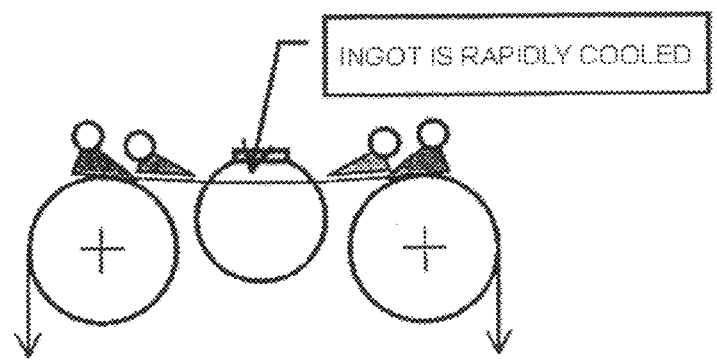
FIG. 14 is an explanatory view showing a relationship between the ingot near a slicing end portion and the slurry for slicing.

Moreover, thermocouples were arranged as shown in FIG. 12(B) to measure a change in temperature of the ingot during a slicing process.

Figure 3:
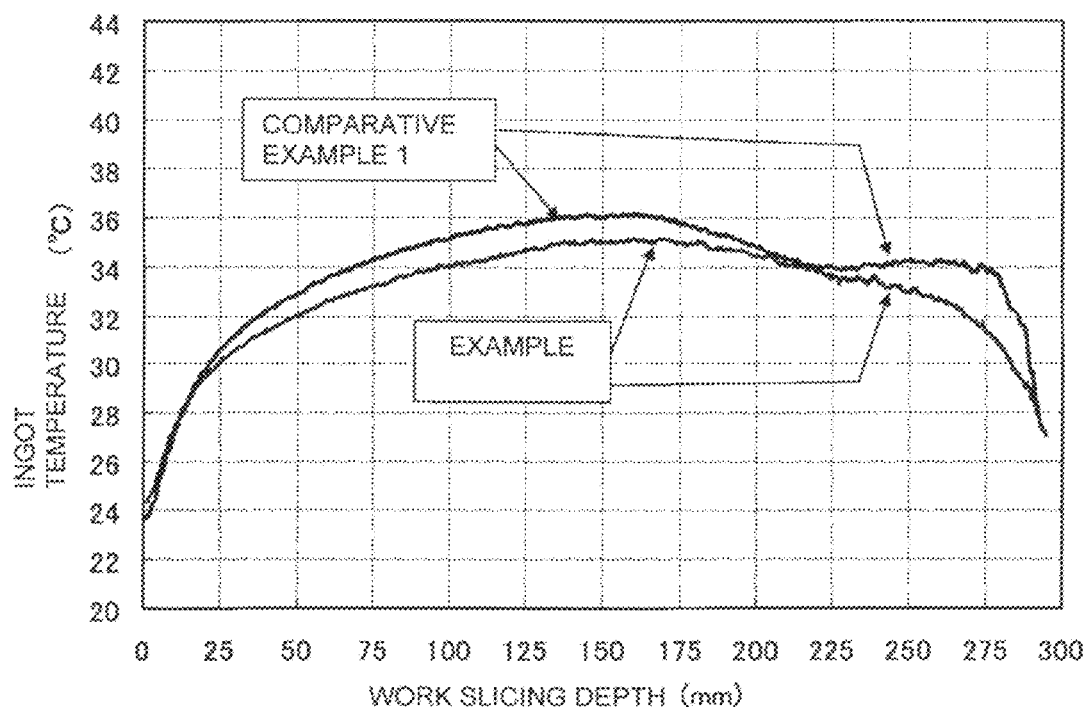
FIG. 3 is a graph showing a temperature change of the ingot in Example and comparative Example 1.

FIG. 3 shows a change in temperature of the ingot at this time. FIG. 3 also depicts a change in temperature of the ingot when the slurry for adjusting an ingot temperature is not supplied for a comparison (later-explained Comparative Example 1).

As shown in FIG. 3, it can be understood that the change of ingot temperature was made to be moderate during a slicing process and rapid cooling was sufficiently alleviated at a position near a slicing end portion when the slurry for adjusting an ingot temperature was supplied in accordance with the temperature profile depicted in FIG. 2(B), especially as compared with Comparative Example 1 using the conventional slicing method.

Figure 4:
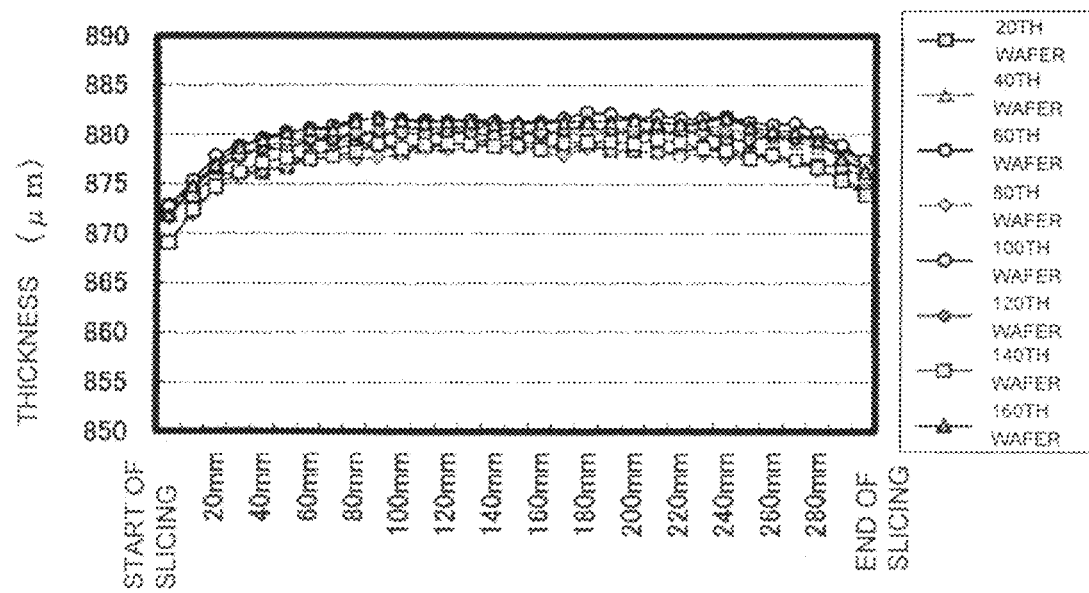
FIG. 4 is a graph showing a thickness distribution of a sliced wafer in Example.

Additionally, thickness distributions of the sliced wafers obtained in Example were measured. FIG. 4 shows measurement results of the sliced wafers, which are 20th, 40th, 60th, 80th, 100th, 120th, 140th, and 160th from a head side of the ingot as representatives. It can be understood that a uniform thickness distribution can be obtained in, especially, the central region in any sample in this manner. Like later-explained Comparative Example 2, when the slurry for adjusting an ingot temperature was continuously supplied from both right and left nozzles, such a uniform thickness distribution cannot be obtained.

Figure 5:
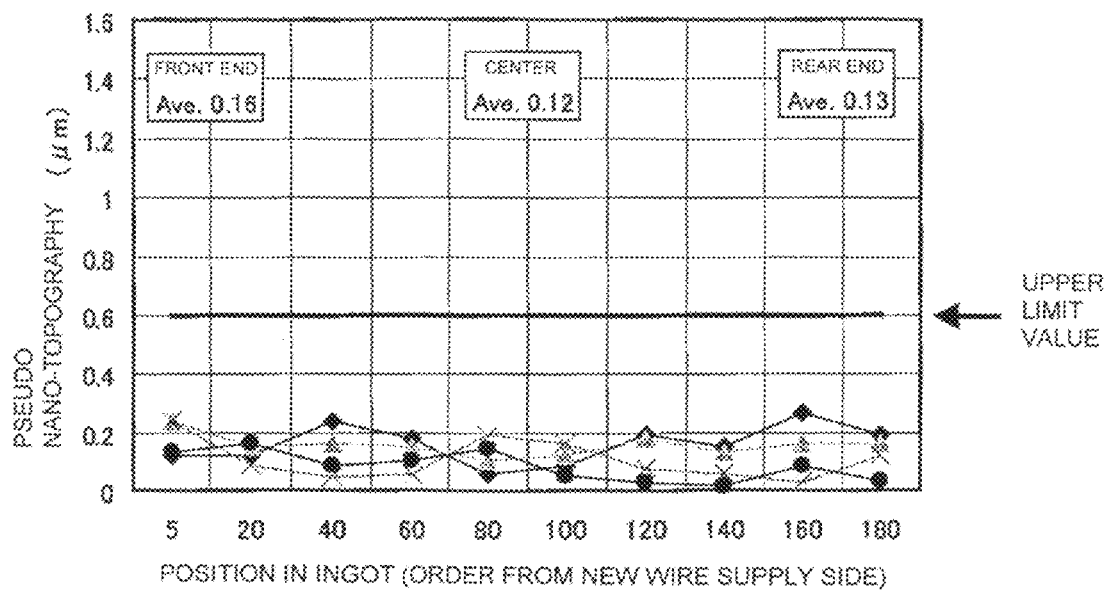
Figure 5:
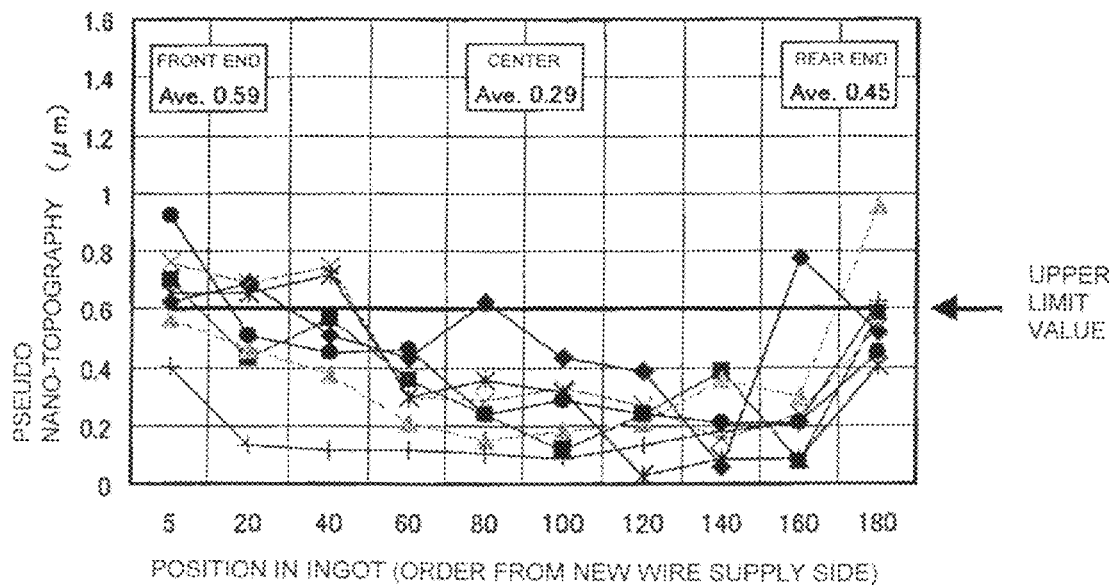

Further, pseudo nano-topographies were examined in sliced wafers obtained by slicing a plurality of ingots based on the same method as Example, and each of results depicted in FIG. 5(A) was obtained. FIG. 5 shows a level of each pseudo nano-topography in the period close to end of slicing with an abscissa representing a position of the ingot in an axial direction. In this manner, the level does not exceed an upper limit value (0.6 as a relative value) in any region of each ingot, an average value in each region of the ingot is 0.16 at a front end portion, 0.12 at a central portion, and 0.13 at a rear end portion, and it can be understood that the average value can be controlled to a very small value.

As explained above, the slicing method according to the present invention controlled the nano-topography very well, and high-quality wafers having a uniform thickness distribution were able to be obtained. When such a wafer is provided, a yield in a device process can be increased.

COMPARATIVE EXAMPLE 1

The silicon ingot was sliced in the same manner as Example except that the slurry for adjusting an ingot temperature was not supplied, thereby 190 wafers were obtained.

As shown in FIG. 3, in relation to a temperature of the ingot during a slicing process, it can be understood that the ingot is rapidly cooled at a position near a slicing end portion (275 mm to 300 mm).

Further, as shown in FIG. 5(B), in obtained sliced wafers, a level of a pseudo nano-topography is high. An average is 0.59 at a front end portion of the ingot, 0.29 at a central portion of the same, or 0.45 at a rear end portion of the same, and the average value is 2.4 to 3.7 times more than the data of Example depicted in FIG. 5(A) in each region. In particular, the level exceeded an upper limit value 0.6 at a position near the slicing end portion of the wafer sliced out from the front end portion or the rear end portion of the ingot in some cases.

The wafer having such a level of the nanatopography greatly affects a yield in a device manufacturing process.

COMPARATIVE EXAMPLE 2

The same silicon ingot as that in Example was sliced in the same manner as Example to obtain 190 sliced wafers except that the slurry for adjusting an ingot temperature was continuously supplied from right and left nozzles 15'L and 15'R regardless of the traveling direction of the wire. It is to be noted that the supply temperature profile of the slurry for adjusting an ingot temperature was the same as that in Example.

As a result of Comparative Example 2, rapid cooling of the ingot near the slicing end portion was able to be avoided.

Figure 16:
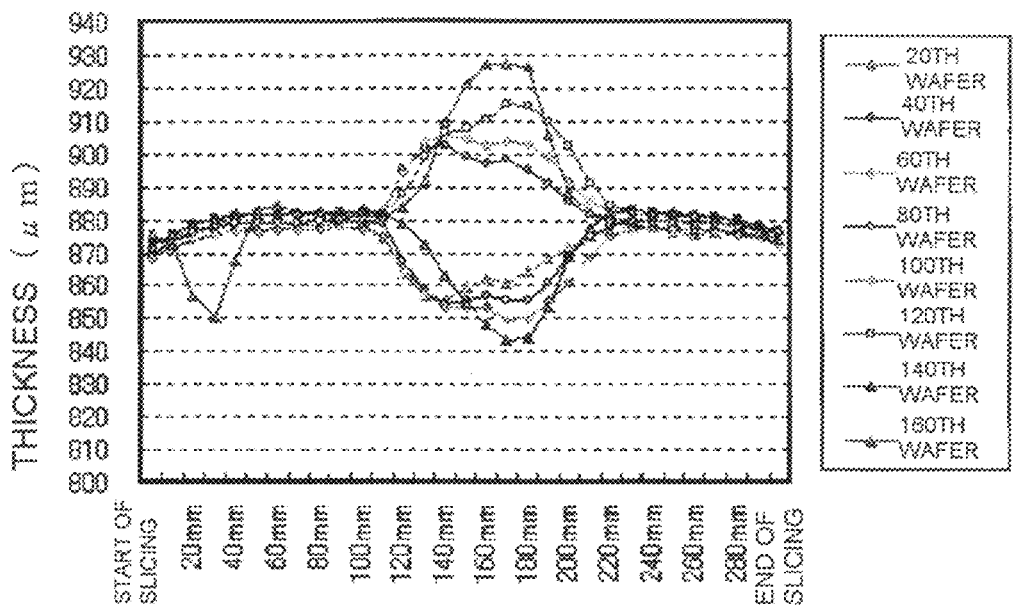
FIG. 16 is a graph showing a thickness shape of a sliced wafer obtained by a conventional method for slicing an ingot.
Figure 17:
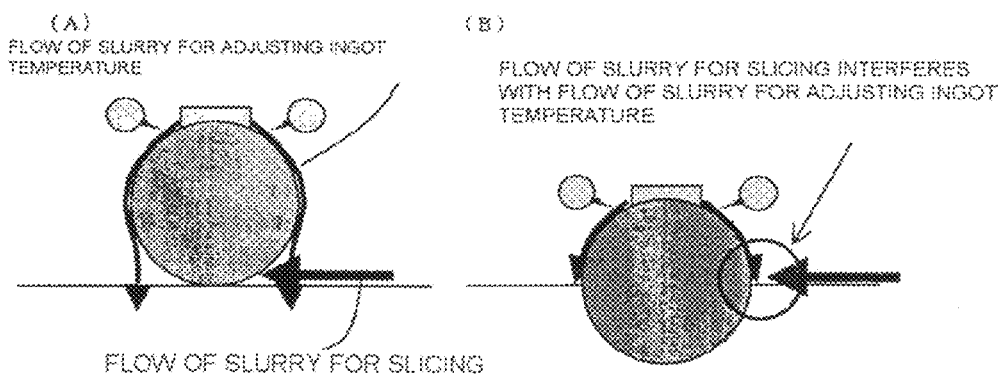

However, when a thickness distribution of each sliced wafer obtained by slicing was measured, a thickness in the central region considerably fluctuated like the case depicted in FIG. 16. It can be considered that this fluctuation occurs because since the slurry for adjusting an ingot temperature was continuously supplied from right and left nozzles 15'L and 15'R, as different from Example in which the present invention examined, naturally the slurry for adjusting an ingot temperature was supplied also at the entry side of the wire, and thus especially when the central region of the wafer was sliced, the slurry for adjusting an ingot temperature greatly interfered with the slurry for slicing at the entry side of the wire to greatly affect the sliced shape.

It is to be noted that the present invention is not restricted to the foregoing embodiment. The embodiment is just an exemplification, and any examples that have substantially the same feature and demonstrate the same functions and effects as those in the technical concept described in claims of the present invention are included in the technical scope of the present invention.

The invention claimed is:

1. A method for slicing an ingot into wafers, the method comprising:
    winding a wire around a plurality of grooved rollers;
    pressing the wire against an ingot to be sliced into wafers while supplying an ingot slicing slurry to the grooved rollers;
    causing the wire to travel in a reciprocating direction;
    controlling an ingot temperature by supplying an ingot temperature adjusting slurry for adjusting the ingot temperature independently from the ingot slicing slurry during slicing of the ingot; and
    supplying the ingot temperature adjusting slurry to the ingot only at an exit side of the wire traveling in the reciprocating direction,
    wherein a supply temperature of the ingot temperature adjusting slurry increases as it is supplied to the ingot from the start of slicing of the ingot, the supply temperature of the ingot temperature adjusting slurry becomes equal to the temperature of the ingot when a slicing depth of the ingot reaches at least ⅔ of the diameter of the ingot, and then the supply temperature of the ingot temperature adjusting slurry is gradually reduced.

2. The slicing method according to claim 1, wherein after the slicing depth of the ingot reaches at least ⅔ of the diameter of the ingot, the supply temperature of the ingot temperature adjusting slurry is gradually reduced to be equal to the supply temperature of the ingot slicing slurry at the end of slicing of the ingot.

3. A wire saw apparatus for slicing an ingot into wafers comprising:
    a plurality of grooved rollers around which a wire is wound;
    a means for supplying an ingot slicing slurry to the grooved rollers;
    a means for supplying an ingot temperature adjusting slurry to the ingot to be sliced, a temperature of the ingot temperature adjusting slurry is controlled independently from the ingot slicing slurry;
    a means for controlling a supply position of the ingot temperature adjusting slurry; and
    the means is capable of controlling the supply of the ingot temperature adjusting slurry to the ingot to be sliced only at an exit side of the wire traveling in the reciprocating direction,
    wherein the ingot is pressed against the wire to be sliced into wafers while the ingot slicing slurry is supplied to the grooved rollers by the means for supplying the ingot slicing slurry, the ingot temperature adjusting slurry is supplied to the ingot by the means for supplying the ingot temperature adjusting slurry, and the wire is caused to travel in a reciprocating direction, and
    the ingot temperature adjusting slurry is supplied while a supply temperature thereof is increased from start of slicing, the supply temperature of the ingot temperature adjusting slurry when the slicing depth of the ingot reaches at least ⅔ of the diameter of the ingot becomes equal to a temperature of the ingot, and then the ingot temperature adjusting slurry is supplied while the supply temperature is gradually reduced by the means for supplying the ingot temperature adjusting slurry.

4. The wire saw apparatus according to claim 3, wherein the means for controlling a supply position of the ingot temperature adjusting slurry includes a switching valve and the ingot temperature adjusting slurry is supplied to the ingot to be sliced only at the exit side of the wire by a changeover of the switching valve.

5. The wire saw apparatus according to claim 3, wherein after the slicing depth of the ingot reaches at least ⅔ of the diameter, the supply temperature of the ingot temperature adjusting slurry is gradually reduced to be equal to the supply temperature of the ingot slicing slurry at end of slicing by the means for supplying the ingot temperature adjusting slurry.

6. The wire saw apparatus according to claim 4, wherein after the slicing depth of the ingot reaches at least ⅔ of the diameter, the supply temperature of the ingot temperature adjusting slurry is gradually reduced to be equal to the supply temperature of the ingot slicing slurry at end of slicing by the means for supplying the ingot temperature adjusting slurry.

\* \* \* \* \*